United States Patent Office 3,505,309
Patented Apr. 7, 1970

3,505,309
PROCESS FOR LACTULOSE
Raul Carubelli, Oklahoma City, Okla., assignor to Research Corporation, New York, N.Y., a nonprofit corporation of New York
No Drawing. Filed Sept. 25, 1967, Ser. No. 670,457
Int. Cl. C07c 47/18; C13k 9/00
U.S. Cl. 260—209                                    4 Claims

ABSTRACT OF THE DISCLOSURE

Lactose is isomerized into lactulose by solution in dilute aqueous alkali metal tetraborate solution and adsorption from the solution onto a body of a strong-base anion exchange resin in the borate form at a temperature of about 20–50° C.

---

This invention relates to a method for the isomerization of lactose to lactulose.

Lactulose (4-0-β-D-galactopyranosyl-D-fructofuranose) is useful as a substitute for sucrose or lactose, particularly in milk powder and infant formulations. The presently known methods for the preparation of lactulose are modifications of the original method of Montgomery and Hudson, which is based on the alkaline isomerization of lactose by the action of calcium hydroxide. In alkaline solution, the D-glucose moiety of lactose undergoes a Lobry de Bruyn-type rearrangement to form a terminal D-fructose. The low yields of lactulose obtained by such methods are attributed to the lability of β-alkoxycarbonyl compounds at alkaline pH's.

The formation of complexes between neutral sugars and borate ions has been utilized for the separation of sugars by paper chromatography, paper ionophoresis, and ion-exchange chromatography. The latter gives satisfactory results with lactose provided that the column of resin is maintained at a low temperature. I have now discovered that at room temperature or above a considerable portion of the lactose undergoes chemical changes while adsorbed onto the chromatographic column thereby resulting in the isomerization of lactose to lactulose.

It is, therefore, a principal object of the present invention to provide a novel and improved approach to the isomerization of lactose to lactulose.

It is a further object of the invention to provide a method for the preparation of lactulose wherein β-elimination and other alkaline-induced yield-decreasing side reactions are minimized.

In accordance with these objects, the present invention is a process for the preparation of lactulose which comprises dissolving lactose in dilute aqueous alkali metal tetraborate solution, and adsorbing the lactose from solution onto a column of strong-base anion exchange resin in the borate form, said column and solution being at a temperature of about 20–50° C. The thereby formed lactulose is separated by elution from the column and recovered from the eluate.

The strong-base anion exchange resins utilized in the practice of the present invention comprise quaternary ammonium groups fixed to a poly(styrene-divinylbenzene) matrix. Suitable strong-base anion exchange resins are commercially available under the trade names Amberlite IRA–400, Dowex–1 and the like. Particularly convenient for use in practicing the process of the present invention are moderately cross-linked resins 50–400 mesh in size. The resin column is washed with 4 N hydrochloric acid and converted to the borate form by treatment with alkali metal tetraborate solution prior to use.

EXAMPLE 1

Lactose (50 mg.) was dissolved in 0.005 M potassium or sodium tetraborate (10 ml.), and allowed to equilibrate for 2 hours prior to introduction into a 1 x 14.5 cm. column of 50–100 mesh Dowex 1–X8 at room temperature. Elution was with 0.005 M followed by 0.015 M alkali metal tetraborate. The elution was monitored by analysis of 1-ml. aliquots of the eluate using the anthrone reaction. The fractions corresponding to the individual peaks were pooled, and the alkali metal tetraborate removed by passage of the pooled fractions through a column of Dowex 50-W (H+), a strong-acid sulfonated poly(styrene-divinylbenzene) cation exchange resin.

Two principal fractions were obtained on elution of adsorbed carbohydrate. The first (fraction Nos. 20–42) was unchanged lactose and the second (fraction Nos. 67–88) was a ketose-containing product as established by the Seliwanoff reaction. The product was hydrolyzed by heating in 0.5 N sulfuric acid at 100° C. for 2 hours. The cooled hydrolysate was neutralized with saturated barium hydroxide and the precipitated barium sulfate removed by centrifugation. The chromatographic identification of galactose and fructose in the products of acid hydrolysis suggested that the product was lactulose.

An authentic sample of lactulose was prepared by the conventional alkaline isomerization of lactose with lime water. The lactulose prepared by the method of the present invention and the sugars obtained on hydrolysis exhibited chromatographic mobility and ionophoretic migration in borate buffer identical with those of authentic lactulose and its hydrolysis products. The results are summarized in the table below:

|  | $R_G$ by paper chromatography in— | | $M_F$ by iono-phoresis in 0.05 M borate |
|---|---|---|---|
|  | 3 Methyl-1-butanol-pyridine-0.1 N HCl | Ethyl acetate-pyridine-water |  |
| Standard sugars: |  |  |  |
| Lactose | 0.63 | 0.72 | 0.42 |
| Lactulose | 0.73 | 0.78 | 0.72 |
| Galactose | 0.88 | 0.94 | 0.92 |
| Fructose | 1.06 | 1.06 | 0.89 |
| Treated lactose: |  |  |  |
| First fraction | 0.63 | 0.72 | 0.41 |
| Second fraction | 0.73 | 0.79 | 0.72 |
| Hydrolysate of second fraction | 0.88; 1.06 | 0.93; 1.07 | 0.90 |

The ionophoresis experiments were performed either on Schleicher and Schuell No. 598 or on Whatman No. 3 MM filter papers in 0.05 M borax buffer at pH 9.2. The separations were done at 375 volts for 4 hours in a water-cooled instrument of the horizontal type (Research Equipment Corporation, Model E–800–2). The paper chromatography was performed on Whatman No. 1 filter paper with the solvent systems 3-methyl-1-butanol-pyridine-0.1 N hydrochloric acid (4:4:2) and ethyl acetate-pyridine-water (100:55:65). The chromatograms were developed by descending irrigation for 23 hours, and the front of the solvent was allowed to flow out of the serrated end of the paper. The dried chromatograms were treated either with an anthrone or with a urea spray reagent, both of which are specific for ketoses. The spots were outlined with pencil and the paper was then sprayed with benzidine reagent to locate all reducing sugars.

Paper chromatograms of the hydrolysate showed two spots positive to sugar reagents and the $R_{glucose}$ is given for each spot in both solvent systems. The ionophoretic experiment gave a single spot because mixtures of galactose and fructose cannot be resolved; this is indicated by the $M_{glucsoe}$ of the standard sugars.

EXAMPLE 2

When the preparative procedure of Example 1 was repeated in a cold room at 4° C., a single peak or principal fraction was obtained on elution. No lactulose was isolated and only lactose was recovered. Comparable experiments at the preferred column temperature range of 20–35° C. gave about a 25% yield of lactulose with about 25% of the unconverted lactose being recovered at the lower end of the range. Lactulose was produced at temperatures up to 50° C. However, carbohydrate decomposition increased in the upper end of the range and little or no lactose was recovered in experiments performed at 35° C. or higher.

EXAMPLE 3

The room temperature preparative procedure of Example 1 was repeated first using 50 mg. of maltose and then using 50 mg. of cellobiose in place of lactose. Three principal fractions were obtained on elution in the maltose experiment, a smaller first fraction of unreacted maltose, a large second fraction apparently of maltulose and a third fraction containing glucose presumably formed via $\beta$-elimination of the keto-disaccharide. Three principal fractions were also obtained in the cellobiose experiment, a large first fraction of unchanged cellobiose, a large second fraction of presumably isomerized cellobiose and a final minor fraction containing glucose.

Preferred embodiments of my invention have been illustrated by means of the non-limiting examples presented above. Other variations falling within the scope of my invention will suggest themselves to those skilled in the art and my invention is as claimed.

The work on which this application was based was financed in whole or in part by the Public Health Service.

I claim:
1. A process for the preparation of lactulose which comprises dissolving lactose in dilute aqueous alkali metal tetraborate solution, and adsorbing the lactose from solution onto a column of a strong-base anion exchange resin in the borate form, said column and solution being at a temperature of about 20–50° C., thereby isomerizing a portion of the adsorbed lactose to lactulose.

2. A process according to claim 1 wherein the temperature is room temperature.

3. A process according to claim 1 wherein the lactulose is separated by elution from the column and recovered from the eluate.

4. A process for the preparation of lactulose which comprises dissolving lactose in 0.005 M aqueous potassium tetraborate solution, passing the solution through a column of a quaternary ammonium anion exchange resin in the borate form, said column and solution being at a temperature of about 20–35° C., passing 0.015 M aqueous potassium tetraborate solution through the column to elute the lactulose formed from the column, and recovering the lactulose from the eluate.

References Cited

UNITED STATES PATENTS 2,818,851  1/1958  Khym _____ 127—46 X

OTHER REFERENCES

J. F. Mendicino, J. Am. Chem. Soc., 82, 4975–4979 (1960).

MORRIS O. WOLK, Primary Examiner

SIDNEY MARANTZ, Assistant Examiner

U.S. Cl. X.R.

127—42, 46